(12) United States Patent
Tzen et al.

(10) Patent No.: US 12,179,786 B2
(45) Date of Patent: Dec. 31, 2024

(54) COMPUTER-BASED VEHICLE CONTROL AND PREDICTED VEHICLE OPERATION

(71) Applicant: International Business Machines Corporation, Armonk, NY (US)

(72) Inventors: Boyi Tzen, Taipei (TW); Fan Yang, Beijing (CN); Su Liu, Austin, TX (US); Geeth Ranmal de Mel, Warrington (GB)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 18/306,056

(22) Filed: Apr. 24, 2023

(65) Prior Publication Data

US 2024/0351602 A1    Oct. 24, 2024

(51) Int. Cl.
| | |
|---|---|
| *B60Q 1/00* | (2006.01) |
| *B60K 35/00* | (2006.01) |
| *B60W 30/09* | (2012.01) |
| *B60W 30/095* | (2012.01) |
| *B60W 40/08* | (2012.01) |

(Continued)

(52) U.S. Cl.
CPC .............. *B60W 50/14* (2013.01); *B60K 35/00* (2013.01); *B60W 30/09* (2013.01); *B60W 30/0956* (2013.01); *B60W 40/08* (2013.01); *B60K 35/28* (2024.01); *B60K 35/29* (2024.01); *B60K 2360/177* (2024.01); *B60K 2360/178* (2024.01); *B60K 2360/1868* (2024.01); *B60W 2050/146* (2013.01); *B60W 2540/223* (2020.02);

(Continued)

(58) Field of Classification Search
CPC .. B60W 50/14; B60W 30/09; B60W 30/0956; B60W 40/08; B60W 2540/225; B60W 2540/223; B60W 2556/65; B60W 2554/4045; B60W 2050/146; B60K 35/00; B60K 2360/178; B60K 35/28; B60K 2360/1868; B60K 35/29; B60K 2360/177
See application file for complete search history.

(56) References Cited

U.S. PATENT DOCUMENTS

| | | | |
|---|---|---|---|
| 6,388,410 B1 * | 5/2002 | Hohn | ................... B60R 25/1001 318/449 |
| 9,371,099 B2 | 6/2016 | Lagassey | |

(Continued)

OTHER PUBLICATIONS

"What is predictive analytics?" IBM Topics, printed Feb. 7, 2023, 8 pages. https://www.ibm.com/topics/predictive-analytics.

(Continued)

*Primary Examiner* — Quang Pham
(74) *Attorney, Agent, or Firm* — Joseph P. Curcuru (57) ABSTRACT

In an approach to improve manual and autonomous operations of a vehicle embodiments predict a moving intention of a first vehicle. Based on the predicted moving intention embodiments broadcast and share the predicted vehicle moving intention of the first with a set of key vector data through a predefined network to a second vehicle. Further, embodiments receive the broadcasting signal embedded with the set of key vector data related to vehicle moving intention nearby and map the received vehicle moving intentions to two-dimensional (2d) or three-dimensional (3D) spatial map. Additionally, embodiments render the 2D or 3D spatial map with the mapped vehicle moving intentions in a virtual display.

20 Claims, 5 Drawing Sheets

(51) Int. Cl.
  *B60W 50/14* (2020.01)
  *B60K 35/28* (2024.01)
  *B60K 35/29* (2024.01)
(52) U.S. Cl.
  CPC .............. *B60W 2540/225* (2020.02); *B60W 2554/4045* (2020.02); *B60W 2556/65* (2020.02)

(56) References Cited

U.S. PATENT DOCUMENTS

| | | | |
|---|---|---|---|
| 9,395,384 | B1 | 7/2016 | Dosher |
| 9,395,416 | B2* | 7/2016 | Krieg ................ G01R 31/3832 |
| 9,473,970 | B2* | 10/2016 | Fujishiro ............ H04W 36/302 |
| 9,734,714 | B1 | 8/2017 | Fan |
| 10,094,671 | B2* | 10/2018 | Kondo .................. G01C 21/28 |
| 10,358,131 | B2* | 7/2019 | van Nunen ............ G01B 21/16 |
| 10,755,557 | B2* | 8/2020 | Tanabe .................. G08G 1/164 |
| 10,802,106 | B2* | 10/2020 | Sogabe ..................... G01S 5/14 |
| 11,104,334 | B2* | 8/2021 | Yan ..................... G05D 1/0088 |
| 11,137,832 | B2 | 10/2021 | Katz |
| 11,157,869 | B2* | 10/2021 | Wissinger ................ H04B 7/26 |
| 11,847,912 | B1* | 12/2023 | Clark ................... G08G 1/0967 |
| 11,993,265 | B2* | 5/2024 | Oguro ..................... B60L 3/106 |
| 12,049,218 | B2* | 7/2024 | Balakrishnan ........ G08G 1/0112 |
| 2001/0044697 | A1* | 11/2001 | Kageyama ............. G08G 1/207 701/482 |
| 2004/0077330 | A1* | 4/2004 | Kusayanagi ........... G08G 1/161 455/404.1 |
| 2006/0271744 | A1* | 11/2006 | Goodman ........... G06F 12/0833 711/141 |
| 2007/0168639 | A1* | 7/2007 | McCalpin ........... G06F 12/0833 711/206 |
| 2012/0280653 | A1* | 11/2012 | Prosser ................ B60L 53/305 320/109 |
| 2013/0173067 | A1* | 7/2013 | Kaneko ............. G06Q 10/0631 700/276 |
| 2013/0317665 | A1* | 11/2013 | Fernandes ............ G08G 5/0039 701/1 |
| 2014/0058761 | A1* | 2/2014 | Freiberger ......... G06Q 10/0639 705/4 |
| 2015/0170438 | A1 | 6/2015 | Rosenbaum |
| 2015/0248370 | A1* | 9/2015 | Momeni ............. G06F 13/4221 710/104 |
| 2015/0312197 | A1* | 10/2015 | Dong .................... G06F 3/0481 715/752 |
| 2016/0157114 | A1* | 6/2016 | Kalderen .............. H04W 24/08 370/252 |
| 2016/0243956 | A1* | 8/2016 | Yuan ...................... B60L 3/0046 |
| 2017/0101093 | A1* | 4/2017 | Barfield, Jr. ........ G08G 1/09675 |
| 2017/0132930 | A1* | 5/2017 | Ando .................... G08G 1/163 |
| 2017/0270792 | A1* | 9/2017 | Breton .................... G01S 19/14 |
| 2017/0284824 | A1* | 10/2017 | Korzunov .......... G01C 21/3697 |
| 2018/0173240 | A1* | 6/2018 | Fang .................... G05D 1/0212 |
| 2018/0365909 | A1* | 12/2018 | Cheng .................... H04W 4/40 |
| 2018/0365911 | A1* | 12/2018 | Raviram .............. G07C 5/0825 |
| 2019/0072983 | A1* | 3/2019 | Zhang .................. G05D 1/0094 |
| 2019/0205669 | A1* | 7/2019 | Altinger ................ G06V 20/584 |
| 2019/0263401 | A1* | 8/2019 | Yoo ........................ B60W 10/04 |
| 2019/0389462 | A1* | 12/2019 | Gesch ............. B60W 30/18163 |
| 2020/0247369 | A1* | 8/2020 | Ahnfalk .............. B60W 50/085 |
| 2021/0007095 | A1* | 1/2021 | Eldessoki .............. H04L 5/0048 |
| 2021/0026358 | A1* | 1/2021 | Sheu .................... G05D 1/0274 |
| 2021/0027628 | A1* | 1/2021 | Pfadler ................ G05D 1/0246 |
| 2021/0094581 | A1* | 4/2021 | Lee .................. B60W 50/0205 |
| 2021/0201679 | A1* | 7/2021 | Kuwahara .......... G01C 21/3807 |
| 2021/0377903 | A1* | 12/2021 | Yang .................... H04W 64/003 |
| 2022/0005354 | A1* | 1/2022 | Baghel ................. H04W 88/04 |
| 2022/0081003 | A1* | 3/2022 | Brown ................ B60W 30/143 |
| 2022/0089141 | A1* | 3/2022 | Ogawa ..................... B60K 6/28 |
| 2022/0303184 | A1* | 9/2022 | Iwahashi ............... H04L 47/822 |
| 2022/0315028 | A1* | 10/2022 | Kawano ............. G01C 21/3896 |
| 2022/0417700 | A1* | 12/2022 | Lee ......................... H04H 20/71 |
| 2023/0031826 | A1* | 2/2023 | Yoshikawa ........... B60W 50/14 |
| 2023/0034843 | A1* | 2/2023 | Moncomble ........... G08G 1/087 |
| 2023/0121388 | A1* | 4/2023 | Khan .................. B60W 40/105 340/435 |
| 2023/0391371 | A1* | 12/2023 | Donderici ......... B60W 60/0016 |
| 2023/0415753 | A1* | 12/2023 | Zhou ...................... G05B 17/02 |
| 2024/0217480 | A1* | 7/2024 | McCall .................. B60R 25/31 |
| 2024/0217511 | A1* | 7/2024 | Matsuoka ............... H04W 4/46 |
| 2024/0217514 | A1* | 7/2024 | Yamada ................ B60W 30/16 |
| 2024/0217548 | A1* | 7/2024 | Pronovost .............. G06N 20/00 |
| 2024/0233549 | A1* | 7/2024 | Goto ........................ G08G 1/16 |
| 2024/0244108 | A1* | 7/2024 | Endo ....................... B60R 16/02 |
| 2024/0246479 | A1* | 7/2024 | Barrera .................. B60Q 1/525 |
| 2024/0246531 | A1* | 7/2024 | Lennartsson ..... B60W 60/0015 |
| 2024/0246537 | A1* | 7/2024 | Kurutach .......... B60W 50/0097 |
| 2024/0246553 | A1* | 7/2024 | Kuehner ........... B60W 60/0013 |

OTHER PUBLICATIONS

Chang, B., "A 3D car dashboard that can be seen without glasses is coming in 2022—see how it works," Business Insider, Apr. 25, 2020, 10 pages. https://www.businessinsider.com/continental-3d-car-dashboard-2022-2020-4.

Gebert et al., "End-to-end Prediction of Driver Intention using 3D Convolutional Neural Networks," 2019 IEEE Intelligent Vehicles Symposium (IV), Jun. 2019, 6 pages. https://cvhci.anthropomatik.kit.edu/~aroitberg/publications/DriverManeuverPrediction_IV19.pdf.

Kim et al., "Cooperative Autonomous Driving: A Mirror Neuron Inspired Intention Awareness and Cooperative Perception Approach," IEEE Intelligent Transportation Systems Magaine, Fall 2016, pp. 23-32. https://ieeexplore.ieee.org/document/7518716.

Liu et al., "Vehicle Motion Intention Reasoning using Cooperative Perception on Urban Road," 2014 IEEE 17th International Conference on Intelligent Transportation Systems (ITSC), Oct. 2014, pp. 424-430. https://ieeexplore.ieee.org/document/6957727.

Oza et al., "Object Detection using IoT and Machine Learning to Avoid Accident and Improve Road Safety," International Journal of Engineering Research & Technology (IJERT), vol. 9, Issue 6, Jun. 2020, pp. 1001-1006. https://www.ijert.org/research/object-detection-using-iot-and-machine-learning-to-avoid-accident-and-improve-road-safety-IJERTV9IS060640.pdf.

Rajadattu et al., "Car Door Control Based on Nearby Approaching of Objects," International Research Journal of Engineering and Technology (IRJET), vol. 07, Issue: 04, Apr. 2020, pp. 5560-5565. https://www.irjet.net/archives/V7/i4/IRJET-V7I41046.pdf.

Sequeira, C., "Development of a Vehicle Awareness Module for Bicycles," Thesis, KTH Royal Institute of Technology, 2017, 49 pages. https://kth.diva-portal.org/smash/get/diva2:1180943/FULLTEXT01.pdf.

Von Sawitzky et al., "Attention! A Door Could Open."—Introducing Awareness Messages for Cyclists to Safely Evade Potential Hazards, Multimodal Technologies and Interaction, 2022, pp. 1-24. https://www.mdpi.com/2414-4088/6/1/3/htm.

Xing et al, "An Ensemble Deep Learning Approach for Driver Lane Change Intention Inference," Transportation Research Part C 115, 2020, Oct. 26, 2015, pp. 1-19. https://www.sciencedirect.com/science/article/abs/pii/S0968090X19308332.

Zhu et al., "A Novel Vehicle Open Door Safety System Based on Cyclist Detection Using Fisheye Camera and Improved Deep Convolutional Generative Adversarial Nets," 2019 IEEE Intelligent Vehicles Symposium (IV), Jun. 2019, pp. 2195-2201. DOI: 10.1109/IVS.2019.8814269.

* cited by examiner

COMPUTER-BASED VEHICLE CONTROL AND PREDICTED VEHICLE OPERATION

BACKGROUND OF THE INVENTION

The present invention relates generally to autonomous vehicle, and more particularly to the field of improving vehicle operations.

Most vehicle accidents are caused by improper operations (e.g., Lack of context Information, mistakes of predictions, wrong reactions, and improper operations). For instance, it is illegal to open a door into moving traffic out of concern for bicycle safety because doing so increases collisions that may result in injury to those riding near parked vehicles. Driving intentions can be analysis and predicted, and all moving objects can be detected and located. Autonomous cars rely on sensors, actuators, complex algorithms, machine learning systems, and powerful processors to execute software. Autonomous cars create and maintain a map of their surroundings based on a variety of sensors situated in different parts of the vehicle. IoT devices are pieces of hardware, such as sensors, actuators, gadgets, appliances, or machines, that are programmed for certain applications and can transmit data over the internet or other networks. IoT allows devices to be connected wirelessly to a cloud system. For instance, the car is coupled with an IoT-based technology system that shares information on the road the car is driving on and the vehicle itself when it is moving.

Predictive analytics is a branch of advanced analytics that makes predictions about future outcomes using historical data combined with statistical modeling, data mining techniques and machine learning. Companies employ predictive analytics to find patterns in this data to identify risks and opportunities. Predictive analytics is often associated with big data and data science. Today, companies today are inundated with data from log files to images and video, and all of this data resides in disparate data repositories across an organization. To gain insights from this data, data scientists use deep learning and machine learning algorithms to find patterns and make predictions about future events. Some of these statistical techniques include logistic and linear regression models, neural networks, and decision trees. Some of these modeling techniques use initial predictive learnings to make additional predictive insights.

SUMMARY

Embodiments of the present invention disclose a computer-implemented method, for virtually augmenting and sharing a vehicle moving intention prediction, the computer-implemented method comprising: predicting a moving intention of a first vehicle; broadcasting and sharing the predicted vehicle moving intention of the first with a set of key vector data through a predefined network to a second vehicle; receiving the broadcasting signal embedded with the set of key vector data related to vehicle moving intention nearby; mapping the received vehicle moving intentions to two-dimensional (2d) or three-dimensional (3D) spatial map; and rendering the 2D or 3D spatial map with the mapped vehicle moving intentions in a virtual display.

DETAILED DESCRIPTION

Embodiments of the present invention recognize that modern 360-degree augmented reality (AR) allows driver to view a vehicle in multiple angles. However, embodiments of the present invention recognize the current safety features and visual displays can an information overload and may not be enough enhance safety. Thus, embodiments of the present invention recognize that there is a need in the art to predict, display, and share vehicle moving intentions. More specifically, embodiments of the present invention recognize that there is a need in the art to interpret predicted vehicle movement intentions (vehicle intentions), share the interpreted vehicle intentions, and virtually render and display the vehicle intentions in real-time to a vehicle operator (e.g., an augmented system or a driver).

Embodiments improve the art and solve at least the problems described above by implementing augmented vehicle moving intention prediction and sharing (AVMIPS) enabled with IT sensed context analysis. More specifically, embodiments improve the art and solve at least the problems described above by (i) predicting vehicle movement intentions (left turn, right turn, change lane, accelerate, brake, swerve, etc.) also referred to as an intention predictor, (ii) broadcasting and sharing the predicted vehicle movement intention with a set of predetermined vector data through a predefined network (e.g. ad-hoc), (iii) receiving the broadcasting signal embedded within the set of predetermined vector data related to vehicle movement intention in a vehicle nearby (secondary vehicle within a predetermined range of the first vehicle), (iv) mapping the received vehicle moving intentions to a two-dimensional (2D) or three-dimensional (3D) spatial map, and (v) generating and displaying the 2D or 3D spatial map with the mapped vehicle moving intentions to a user.

Implementation of embodiments of the invention may take a variety of forms, and exemplary implementation details are discussed subsequently with reference to the Figures (i.e., FIG. 1-FIG. 5).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
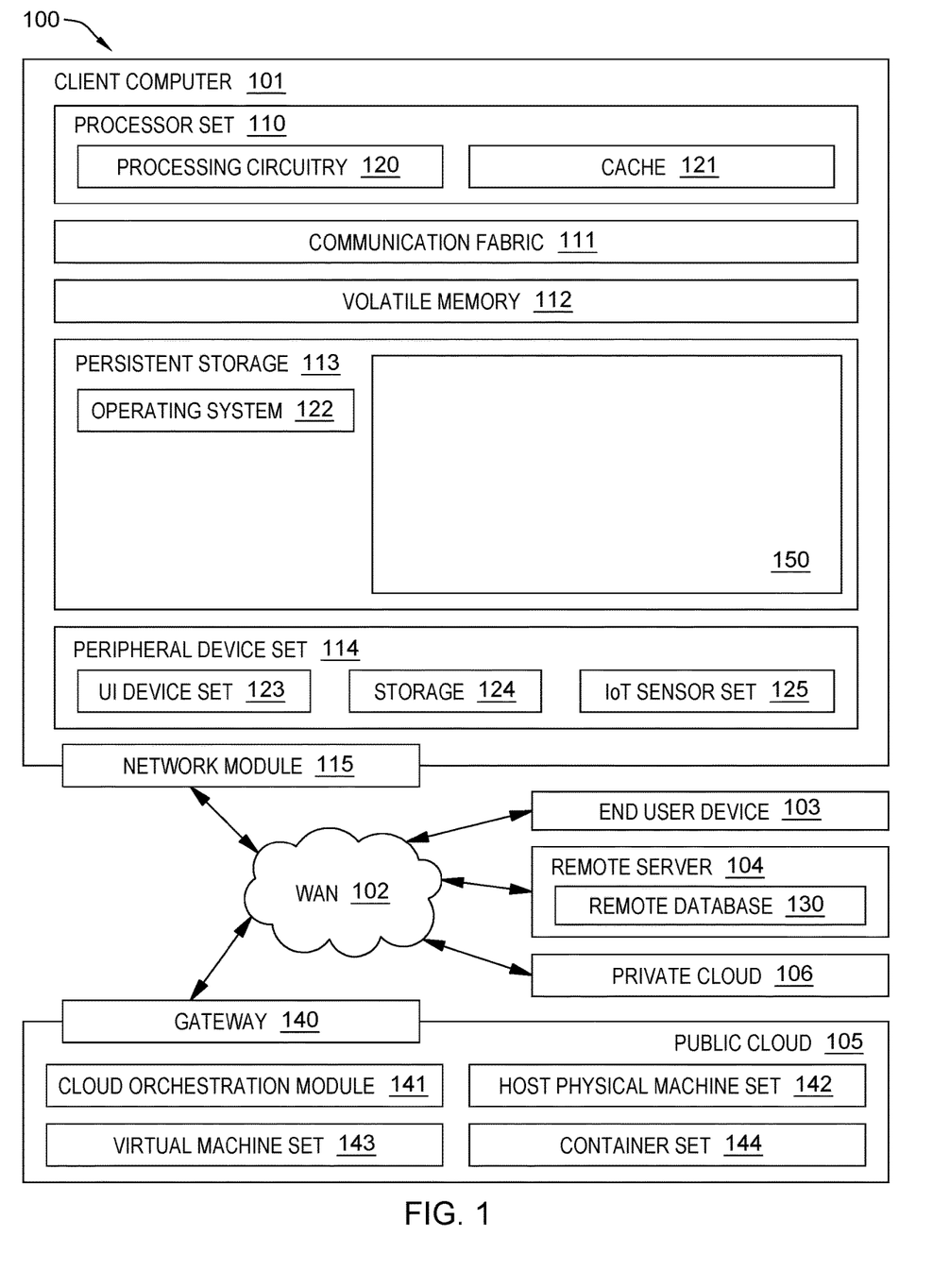
FIG. 1 is a functional block diagram illustrating a distributed data processing environment, executing a vehicle operation optimization program, in accordance with an embodiment of the present invention.

Computing environment 100 contains an example of an environment for the execution of at least some of the computer code involved in performing the inventive methods, such as vehicle operation optimization program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
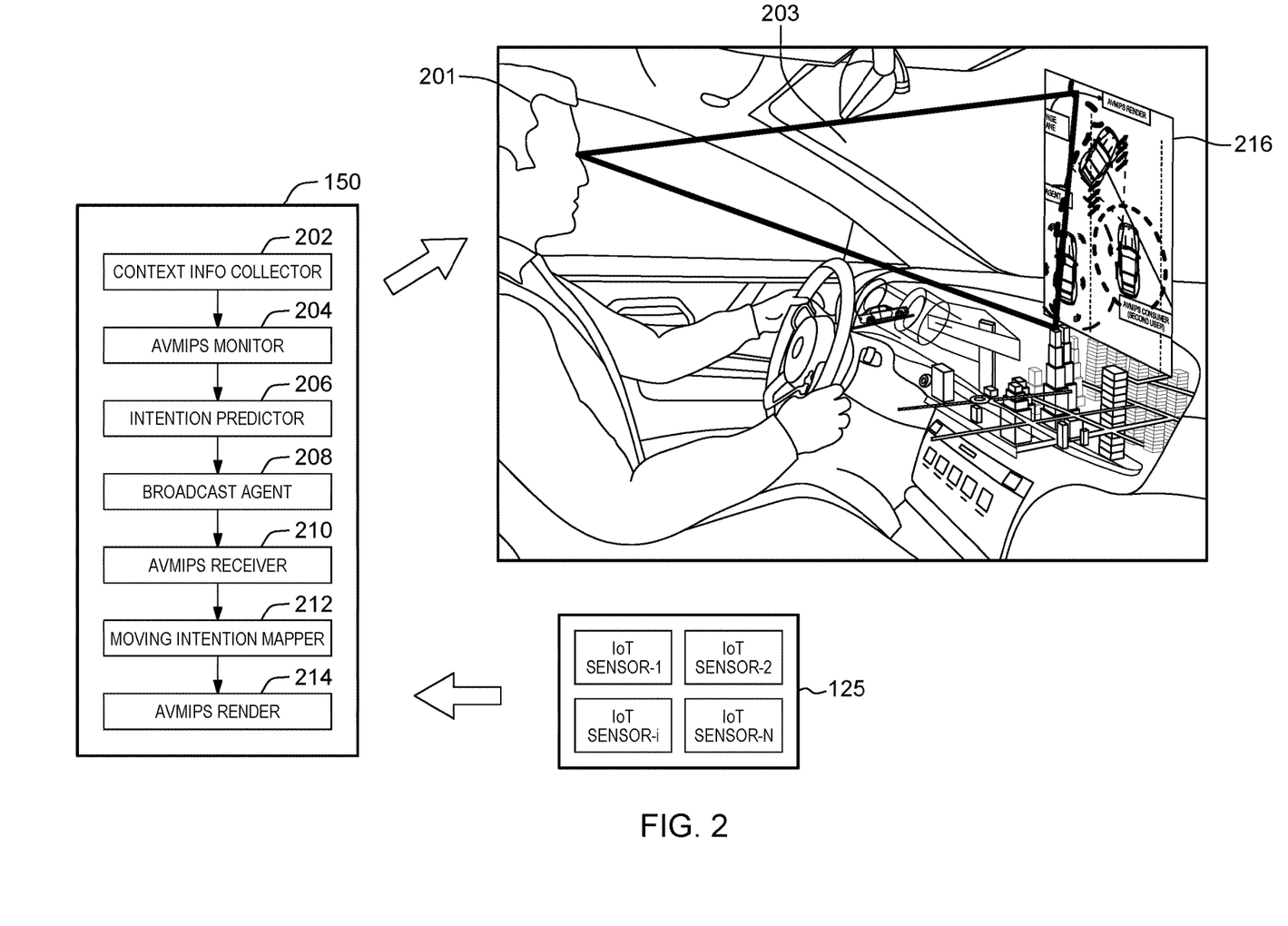
FIG. 2 illustrates a functional block diagram and operational steps of the vehicle operation optimization program, within the distributed data processing environment of FIGS. 1, in accordance with an embodiment of the present invention.

Component 150 improves the art and solve at least the issues stated above by (i) predicting vehicle movement intentions (left turn, right turn, change lane, accelerate, brake, swerve, etc.) also referred to as an intention predictor, (ii) broadcasting and sharing the predicted vehicle movement intention with a set of predetermined vector data through a predefined network (e.g. ad-hoc), (iii) receiving the broadcasting signal embedded within the set of predetermined vector data related to vehicle movement intention in a vehicle nearby (secondary vehicle within a predetermined range of the first vehicle), (iv) mapping the received vehicle moving intentions to a two-dimensional (2D) or three-dimensional (3D) spatial map, and (v) generating and displaying the 2D or 3D spatial map with the mapped vehicle moving intentions to a user.

illustrates a functional block diagram and operational steps of the vehicle operation optimization program, within the distributed data processing environment of FIGS. 1, in accordance with an embodiment of the present invention FIG. 2 is a functional block diagram and operational steps of component 150, generally designated 200, in accordance with one embodiment of the present invention. The term "distributed" as used in this specification describes a computer system that includes multiple, physically distinct devices that operate together as a single computer system. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

In various embodiments component 150 defines, via AVMIPS sharer 201, a framework to support augmented driving intention prediction and share (AVMIPS). AVMIPS sharer 201 may be a driver, a consumer, a programmer, and/or any other type of user known in the art. Component 150 may receive and/or retrieve framework data from a database or profile or in some embodiments the framework defining data is predetermined. In various embodiments, the framework defining data is customizable by AVMIPS sharer 201. In various embodiments, AVMIPS sharer 201 is the driving intention sharer (e.g., sharing driving intentions to other vehicles and/or operators) and/or a consumer who receives shared driving intention from other vehicle operators within a predetermined range (e.g., neighboring vehicles). In the depicted embodiment AVMIPS sharer 201 is receiving a predicted vehicle intention from a neighboring vehicle.

Component 150 may receive and/or retrieve AVMIPS Data saved in AVMIPS Data Structure for handing AVMIPS operations, wherein AVMIPS Data comprises, but is not limited to driver identification (ID), vehicle ID, current vehicle position (x, y, z) and projected vehicle position, position of the driver (x, y, z) in the vehicle, time stamp, moving direction, speed, contexts, and/or predicted vehicle moving intention type (i.e., intention type). Intention type may be any combination of left turn, right turn, change lane, accelerate, brake, swerve, etc. Component 150 may virtually augment and share a vehicle moving intention prediction. AVMIPS Data may be the core of the framework because it includes all information needed by AVMIPS service because the attributes saved in the data structure: position, moving direction, speed, context, may directly impact the final intention type prediction. The predicted intention type may be directly broadcasted, shared, and augmented displayed on AR enabled display devices (e.g., 216 screen) of neighboring vehicles and/or a primary/first vehicle.

In the depicted embodiment, component 150, via context info collector 202, utilizes IoT sensor set 125 to collect contextual information defined in the AVMIPS Data. For example, component 150 utilizes IoT sensor set 125 within a vehicle (e.g., accelerometer, gyroscope, magnetometer, camera, global positioning system (GPS), force sensors, haptic sensors, etc.) to collect driver identification (ID), vehicle ID, current vehicle position (x, y, z) and projected vehicle position, position of the driver (x, y, z) in the vehicle, time stamp, moving direction, speed, contexts, and/or intention type. Further, in the depicted example, component 150, via AVMIPS monitor 204, utilizes IoT sensor set 125 to monitor AVMIPS sharer 201 (i.e., driver) and/or vehicle operation characteristics. For example, steering wheel movements, driver's head/hand movements and gestures, driver's eye-gazing direction, vehicle speed, and/or an identified GPS route.

In the depicted embodiment, component 150, via intention predictor 206, predicts the moving intention of the vehicle associated with a secondary vehicle (e.g., a vehicle within a predetermined distance of a vehicle associated with a first vehicle or AVMIPS sharer 201), wherein moving intention of a vehicle comprises, but is not limited to, left turn, right turn, change lane, and braking. Component 150, via broadcasting agent 208, may broadcast and share the predicted vehicle moving intention(s) with a set of vector data through a predefined network (e.g., ad-hoc), wherein the vectors in the vector data are the predicted moving directions and predicted positions of vehicle (e.g., head, body, tail). In this example, component 150, via AVMIPS receiver 210, receives from broadcasting agent 208, a broadcasting signal with the set of predetermined key vector data related to vehicle moving intentions (e.g., a secondary vehicle).

In the depicted embodiment, component 150, via moving intention mapper 212, maps the received vehicle moving intentions to 2d or 3D spatial map. Mapping may comprise generating a virtual representation that is enabled to be displayed to a user through any type of UI or visual platform known in the art. In this example, component 150 renders the 2D or 3D spatial map with the mapped vehicle moving intentions into visual display 216 so that visual display 216 is within AVMIPS sharer 201 line of sight 203. Visual display 216 may be augmented reality display that digitally imprints the predicted vehicle movement of the secondary vehicle onto the road via augmented reality enabled device (e.g., smart windshield or another type of heads-up display known in the art). In some embodiments, the augmented reality display (i.e., visual display 216) may be interactive and responsive to real-time user and/or vehicle actions. Visual display 216 may virtually display the predicted movements of the secondary vehicle to the driver and autonomously implement actions in response to the identified predicted vehicle movements. For example, implementing the brakes slow the vehicle down, issuing safety alerts, activating haptic alerts, and/or accelerating the vehicle or safely moving the vehicle into a different lane to avoid a collision.

Figure 3:
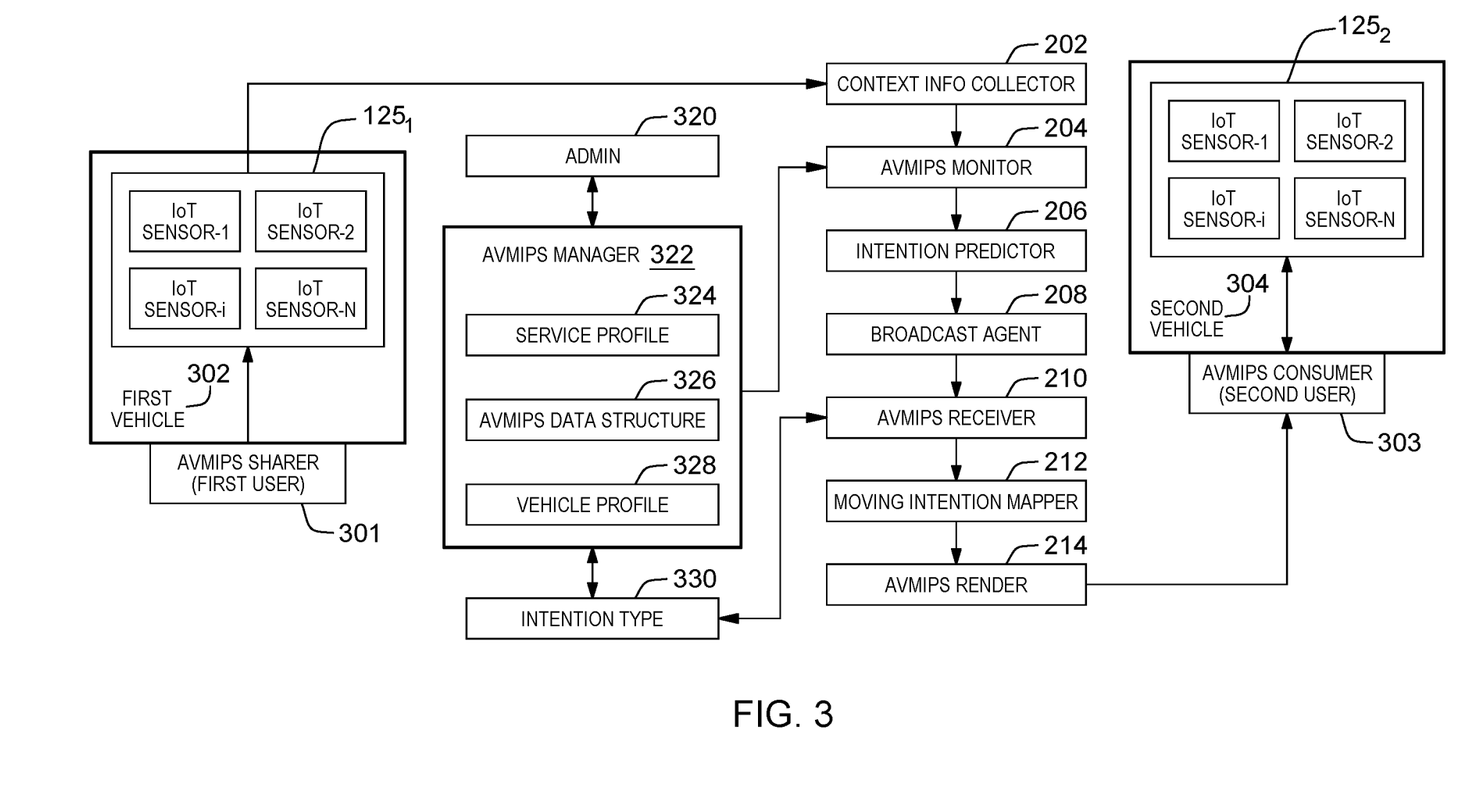
FIG. 3 illustrates a functional block diagram and operational steps of the vehicle operation optimization program, within the distributed data processing environment of FIGS. 1, in accordance with an embodiment of the present invention.

FIG. 3 is a functional block diagram and operational steps of component 150, generally designated 300, in accordance with one embodiment of the present invention. The term "distributed" as used in this specification describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, AVMIPS sharer 301 (i.e., a first user) is operating first vehicle 302 and AVMIPS consumer 303 (i.e., a second user) is operating second vehicle 304, wherein first vehicle 302 comprises IoT sensor set 1251 and second vehicle 302 comprises IoT sensor set 1252. In the depicted embodiment, component 150, via context info collector 202, utilizes IoT sensor set 1251 to collect contextual information defined in the AVMIPS Data. For example, component 150 utilizes IoT sensor set 1251 within first vehicle 302 (e.g., accelerometer, gyroscope, magnetometer, camera, global positioning system (GPS), force sensors, haptic sensors, etc.) to collect contextual information defined in AVMIPS data (e.g. driver identification (ID), vehicle ID, current vehicle position (x, y, z) and projected vehicle position, position of the driver (x, y, z) in the vehicle, time stamp, moving direction, speed, contexts, and/or intention type). Further, in the depicted embodiment, component 150, via AVMIPS monitor 204, utilizes AVMIPS manager 322 to monitor AVMIPS sharer 301 and/or vehicle operation characteristics. For example, steering wheel movements, driver's head/hand movements and gestures, driver's eye-gazing direction, vehicle speed, vehicle performance, vehicle maintenance and/or an identified GPS route. AVMIPS manager 322 may comprise service profile 324, AVMIPS data structure 326, and vehicle profile 328.

AVMIPS manager 322 may be a graphic user interface for admin 320 to configure AVMIPS service, wherein the admin 320 may configure to enable, disable, subscribe, and/or register the AVMIPS. For instance, a user may utilize admin 322 to add and remove attributes and items defined in the AVMIPS data structure. In another example, admin 322 adds/removes intention types, privacy protection polices, IoT sensor type, and ad-hoc network settings. All those configurations can be modified and updated and saved into a service profile. Additionally, admin 322 can register the vehicle and create vehicle profile though AVMIPS manager 322.

AVMIPS manager 322 (via service profile 324, AVMIPS data structure 326, and vehicle profile 328) is a graphical user interface (GUI) for control/configuration of AVMIPS 150. AVMIPS manager may operate at the configuration stage. In real time, context info collector 202 connects to IoT sensor set 1251 and/or IoT sensor set 1252 and collects the context information defined in the AVMIPS data from set of IoT sensors (e.g., IoT sensor set 1251 and/or IoT sensor set 1252). The collected context data may been saved into a predefine AVMIPS data structure (e.g., AVMIPS data structure 326) and may be ready to be used by AVMIPS monitor 204. AVMIPS monitor 204 may monitor the driver/vehicle operation characteristic, such as stealing wheel movements, driver's head/hand movements and gestures, driver's eye-gazing direction based on the collected information data saved in the AVMIPS data structure.

In various embodiments, admin 320 communicates data to AVMIPS manager 322, wherein AVMIPS manager 322 analyzes and communicates the communicated data to AVMIPS monitor 204. Intention predictor 206 may receive information from AVMIPS monitor 204, wherein component 150, via intention predictor 206, predicts the moving intention of the first vehicle 302 buy utilizing the data collected by AVMIPS monitor 204 and sensor set 1251, wherein moving intention of a vehicle comprises, but is not limited to, left turn, right turn, change lane, and braking. Broadcasting agent 208 may receive the predicted moving intentions from intention predictor 206, wherein component 150, via, via broadcasting agent 208, may broadcast and share the predicted vehicle moving intention(s) with a set of predetermined vector data through a predefined network (e.g., ad-hoc) to AVMIPS receiver 210. AVMIPS receiver 210 may receive a broadcasting signal from with the set of predetermined key vector data related to vehicle moving intentions of first vehicle 302.

The vectors are the predicted moving directions and predicted positions of vehicle head, body, tail (i.e., vehicle movement intentions). The vector data can be generated and/or received from a productive analysis and driving intentions. For instance, a driver's head position is detected in real time by IoT sensor set 1251 and used by driver intention analysis. Additionally, driver/vehicle operation characteristic, such as stealing wheel movements, driver's head/hand movements and gestures, driver's eye-gazing direction, monitored and collected by IoT sensor set 1251, can be used as inputs of intension analysis. The vectors may be used to visualize a vehicle moving direction in real time.

Moving intention mapper 212 may map the received vehicle moving intentions from AVMIPS receiver 210 into a 2D or 3D spatial map. Mapping may comprise generating a virtual representation that is enabled to be displayed to a user through any type of UI or visual platform known in the art. The mapping is further detailed in FIG. 4. AVMIPS Render 214 may render and display a digital representation of the 2D or 3D spatial map to AVMIPS consumer 303 in second vehicle 304, wherein the 2D or 3D spatial map comprises a digital animation of the predicted vehicle moving intentions of first vehicle 302. Digital representation may be a digital display screen, augmented reality, virtual reality, and/or any other form of digital display known an understood in the art. Digital animation may be a displayed animation of a vehicles predicted movement(s) in a display screen that is depicted in augmented reality, virtual reality, and/or any other form of digital display known an understood in the art. In various embodiments, the rendering is displayed to vehicle operator in the second vehicle and/or the first vehicle.

Figure 4:
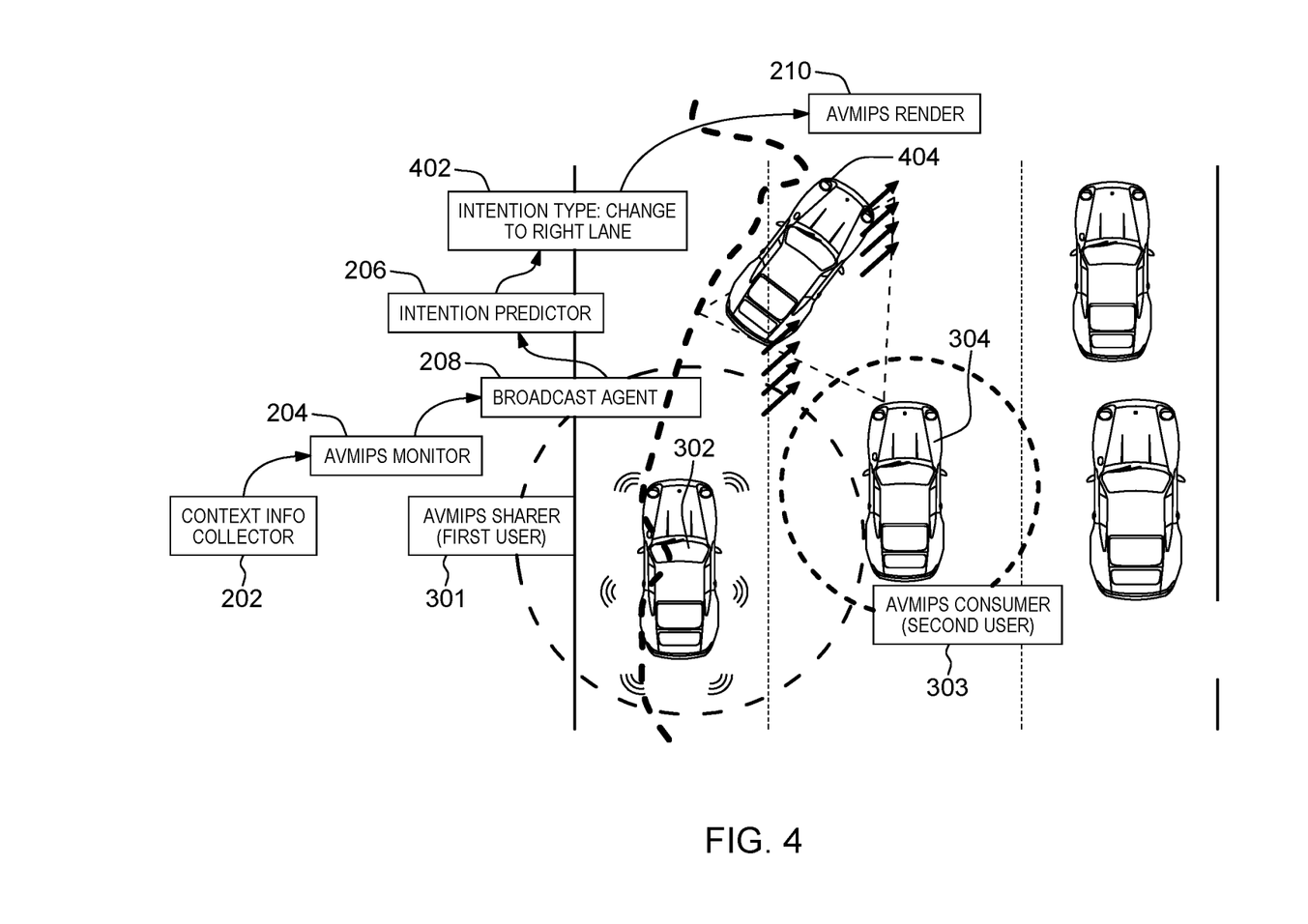
FIG. 4 illustrates one example, in accordance with an embodiment of the present invention.

For example, in FIG. 4, AVIMPS consumer 303 (second user) is alerted of vehicle movement intentions of first vehicle 302. In this example, component 150, via context info collector 202, utilizes IoT sensor set 1251 to collect contextual information defined in the AVMIPS Data. Component 150 utilizes IoT sensor set 1251 within first vehicle 302 (e.g., accelerometer, gyroscope, magnetometer, camera, global positioning system (GPS), force sensors, haptic sensors, etc.) to collect contextual information defined in AVMIPS data (e.g. driver identification (ID), vehicle ID, current vehicle position (x, y, z) and projected vehicle position, position of the driver (x, y, z) in the vehicle, time stamp, moving direction, speed, contexts, and/or intention type). Further component 150, via AVMIPS monitor 204, utilizes an AVMIPS manager (e.g., AVMIPS manager 322) to monitor AVMIPS sharer 301, first vehicle 302 and/or vehicle operation characteristics of first vehicle 302. For example, steering wheel movements, driver's head/hand movements and gestures, driver's eye-gazing direction, vehicle speed, vehicle performance, vehicle maintenance and/or an identified GPS route.

Broadcasting agent 208 may receive the vehicle operation characteristics of first vehicle and/or actions and movements of first vehicle 302 and AVMIPS sharer 301. In the provided example, broadcasting agent 208 issues warnings and/or alerts within first vehicle 302 and second vehicle 304 based on the received vehicle operation characteristics of first vehicle and/or actions and movements of first vehicle 302. Intention predictor 206 may receive information from AVMIPS monitor 204, wherein component 150, via intention predictor 206, predicts the moving intention of the first vehicle 302, wherein moving intention of a vehicle comprises, but is not limited to, left turn, right turn, change lane, and braking. AVMIPS receiver 210 may receive a broadcasting signal from with the set of predetermined key vector data related to vehicle moving intentions of first vehicle 302. Component 150 may determine the moving intention of first vehicle 302 and broadcast the identified moving intention to nearby drivers.

In this example, component 150, via intention predictor, based on the eye movement, visual focus, acceleration, rate of speed, and/or signal indicator identifies that the vehicle movement intention of first vehicle 302 is a lane change into the right lane. AVMIPS render 214 renders and display a digital representation of the 2d or 3D spatial map to AVMIPS consumer 303 in second vehicle 304, wherein 2d or 3D spatial map comprises an augmented reality animation of the predicted vehicle moving intentions of first vehicle 302. In this example, AVMIPS render 214 generates, shares, and displays augmented animation of the predicted right lane change by first vehicle 302 (i.e., augmented visual display of moving intention 404), wherein augmented visual display of moving intention 404 is displayed to AVMIPS consumer 303 via an enabled device. In various embodiments, predicted moving intentions from intention predictor 206, wherein component 150, via, via broadcasting agent 208, may broadcast and share the predicted vehicle moving intention(s) with a set of predetermined vector data through a predefined network (e.g., ad-hoc) to AVMIPS receiver 210.

In various embodiments, after the predicted intention is presented to AVMIPS consumer 303 (e.g., the second driver), component 150 triggers the second vehicles automated horn to alert the first vehicle, proactively and autonomously reduces the speed of the second vehicle (e.g., applies the breaks or reduces speed by impedes acceleration), executes notifications and/or alerts to both the first vehicle and the second vehicle to alert the drivers, and/or implements any collision preventive measures known in the art.

FIG. 4 is an example illustrating model formalization. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

Figure 5:
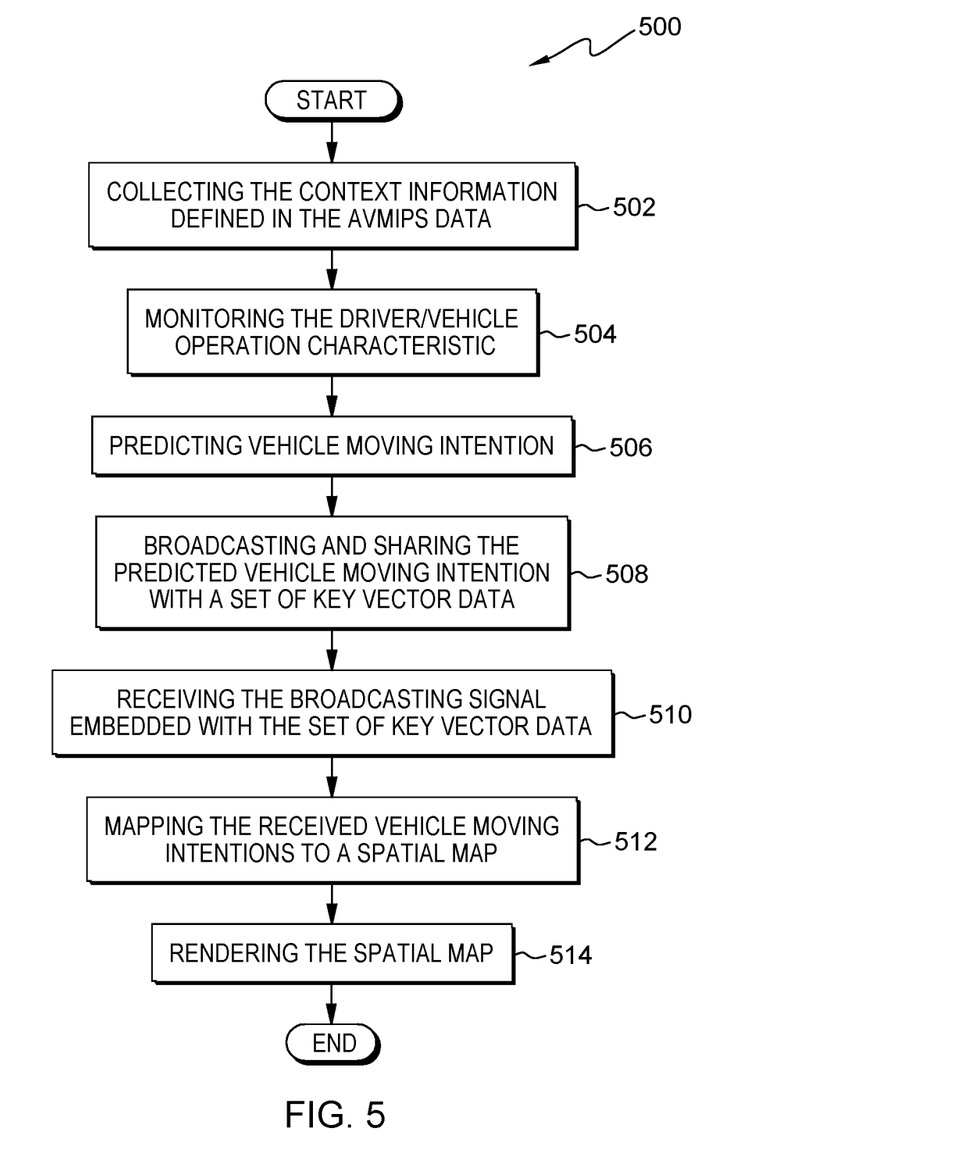
FIG. 5 illustrates operational steps of the vehicle operation optimization program, on a server computer within the distributed data processing environment of FIGS. 1, for virtually augmenting and sharing a vehicle moving intention prediction in accordance with an embodiment of the present invention.

FIG. 5 illustrates operational steps of component 150, generally designated 500, in communication with client computer 101, remote server 104, private cloud 106, EUD 103, and/or public cloud 105, within distributed data processing environment 100, for virtually augmenting and sharing a vehicle moving intention prediction, in accordance with an embodiment of the present invention. FIG. 5 provides an illustration of one implementation and does not imply any limitations with regard to the environments in which different embodiments may be implemented. Many modifications to the depicted environment may be made by those skilled in the art without departing from the scope of the invention as recited by the claims.

In block 502, component 150 collects the contextual information defined in AVMIPs data. In various embodiments, component 150, via context info collector 202, utilizes IoT sensor set 125 to collect contextual information defined in the AVMIPS Data. For example, component 150 utilizes IoT sensor set 125 within a vehicle (e.g., accelerometer, gyroscope, magnetometer, camera, global positioning system (GPS), force sensors, haptic sensors, etc.) to collect driver identification (ID), vehicle ID, current vehicle position (x, y, z) and projected vehicle position, position of the driver (x, y, z) in the vehicle, time stamp, moving direction, speed, contexts, and/or intention type.

In block 504, component 150 monitors driver and vehicle operation characteristics. In various embodiments, component 150, via AVMIPS monitor 204, utilizes IoT sensor set 125 to monitor AVMIPS sharer 201 (i.e., driver) and/or vehicle operation characteristics. For example, steering wheel movements, driver's head/hand movements and gestures, driver's eye-gazing direction, vehicle speed, and/or an identified GPS route.

In block 506, component 150 predicts a moving intention of a vehicle. In various embodiments, component 150, via intention predictor 206, predicts the moving intention of the vehicle associated with a secondary vehicle (e.g., a vehicle within a predetermined distance of a vehicle associated with a first vehicle or AVMIPS sharer 201), wherein moving intention of a vehicle comprises, but is not limited to, left turn, right turn, change lane, and braking.

In block 508, component 150 broadcasts and shares the predicted vehicle moving intention with moving intention with a set of key vector data. In various embodiments, component 150, via broadcasting agent 208, may broadcast and share the predicted vehicle moving intention(s) with a set of predetermined vector data through a predefined network (e.g., ad-hoc).

In block 510, component 150 receives the broadcasting signal embedded with the set of key vector data. In various embodiments, component 150, via AVMIPS receiver 210, receives from broadcasting agent 208, a broadcasting signal with the set of predetermined key vector data related to vehicle moving intentions (e.g., a secondary vehicle).

In block 512, component 150 maps the received vehicle movement intention to a spatial map. In various embodiments, component 150, via moving intention mapper 212, maps the received vehicle moving intentions to 2d or 3D spatial map. Mapping may comprise generating a virtual representation that is enabled to be displayed to a user through any type of UI or visual platform known in the art.

In block 514, component 150 renders the spatial map. In various embodiments, component 150 renders the 2D or 3D spatial map with the mapped vehicle moving intentions into visual display 216 so that visual display 216 is within AVMIPS sharer 201 line of sight.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   predicting a moving intention of a first vehicle based on data collected from a sensor set;
   broadcasting and sharing the predicted moving intention of the first vehicle, with a set of key vector data, through a predefined network to a second vehicle;
   receiving a broadcasting signal embedded with the set of key vector data related to the predicted moving intention of the first vehicle;
   mapping the received moving intention into a two-dimensional (2D) or three-dimensional (3D) spatial map; and
   rendering the 2D or 3D spatial map with the mapped vehicle moving intentions in a virtual display to the second vehicle.

2. The computer-implemented method of claim 1, further comprising:
   collecting context information defined in augmented driving intention prediction and share (AVMIPS) data from a set of internet of things (IoT) sensors.

3. The computer-implemented method of claim 1, further comprising:
   monitoring a driver and vehicle operation characteristics of the driver, wherein the driver and the vehicle operation characteristics comprise: steering wheel movements, driver's head and hand movements and gestures, driver's eye-gazing direction from a set of sensors.

4. The computer-implemented method of claim 1, further comprising:
   defining a framework to support augmented driving intention prediction and sharing.

5. The computer-implemented method of claim 4, further comprising:
   defining a AVMIPS Data Structure for handing AVMIPS operations, wherein AVMIPS Data comprises: driver identification, vehicle identification, position, time stamp, moving direction, speed, contexts, and vehicle intention type.

6. The computer-implemented method of claim 1, wherein the rendering is displayed in augmented reality to a vehicle operator in the second vehicle.

7. The computer-implemented method of claim 1, further comprising:
   responsive to identifying the moving intention of the first vehicle, dynamically executing vehicle operations of the second vehicle autonomously to avoid collision with the first vehicle.

8. A computer system comprising:
   one or more computer processors;
   one or more computer readable storage devices;
   program instructions stored on the one or more computer readable storage devices for execution by at least one of the one or more computer processors, the stored program instructions comprising:
   program instructions to predict a moving intention of a first vehicle based on data collected from a sensor set;
   program instructions to broadcast and sharing the predicted moving intention of the first vehicle, with a set of key vector data, through a predefined network to a second vehicle;
   program instructions to receive a broadcast signal embedded with the set of key vector data related to the predicted moving intention of the first vehicle;
   program instructions to map the received moving intention into a two-dimensional (2D) or three-dimensional (3D) spatial map; and
   program instructions to render the 2D or 3D spatial map with the mapped vehicle moving intentions in a virtual display to the second vehicle.

9. The computer system of claim 8, further comprising:
   program instructions to collect context information defined in augmented driving intention prediction and share (AVMIPS) data from a set of internet of things (IoT) sensors.

10. The computer system of claim 8, further comprising:
    program instructions to monitor a driver and vehicle operation characteristics of the driver, wherein the driver and the vehicle operation characteristics comprise: steering wheel movements, driver's head and hand movements and gestures, driver's eye-gazing direction from a set of sensors.

11. The computer system of claim 8, further comprising:
    program instructions to define a framework to support augmented driving intention prediction and sharing.

12. The computer system of claim 11, further comprising:
    program instructions to define a AVMIPS Data Structure for handing AVMIPS operations, wherein AVMIPS Data comprises: driver identification, vehicle identification, position, time stamp, moving direction, speed, contexts, and vehicle intention type.

13. The computer system of claim 8, wherein the rendering is displayed in augmented reality to a vehicle operator in the second vehicle.

14. The computer system of claim 8, further comprising:
    responsive to identifying the moving intention of the first vehicle, program instructions to dynamically execute vehicle operations of the second vehicle autonomously to avoid collision with the first vehicle.

15. A computer program product comprising:
    one or more computer readable storage devices and program instructions stored on the one or more computer readable storage devices, the stored program instructions comprising:
    program instructions to predict a moving intention of a first vehicle based on data collected from a sensor set;
    program instructions to broadcast and sharing the predicted moving intention of the first vehicle, with a set of key vector data, through a predefined network to a second vehicle;
    program instructions to receive a broadcast signal embedded with the set of key vector data related to the predicted moving intention of the first vehicle;
    program instructions to map the received moving intention into a two-dimensional (2D) or three-dimensional (3D) spatial map; and
    program instructions to render the 2D or 3D spatial map with the mapped vehicle moving intentions in a virtual display to the second vehicle.

16. The computer program product of claim 15, further comprising:
    program instructions to collect context information defined in augmented driving intention prediction and share (AVMIPS) data from a set of internet of things (IoT) sensors.

17. The computer program product of claim 15, further comprising:
    program instructions to monitor a driver and vehicle operation characteristics of the driver, wherein the driver and the vehicle operation characteristics comprise: steering wheel movements, driver's head and hand movements and gestures, driver's eye-gazing direction from a set of sensors.

18. The computer program product of claim 15, further comprising:
- program instructions to define a framework to support augmented driving intention prediction and sharing; and
- program instructions to define a AVMIPS Data Structure for handing AVMIPS operations, wherein AVMIPS Data comprises: driver identification, vehicle identification, position, time stamp, moving direction, speed, contexts, and vehicle intention type.

19. The computer program product of claim 15, wherein the rendering is displayed in augmented reality to a vehicle operator in the second vehicle.

20. The computer program product of claim 15, further comprising:
- responsive to identifying the moving intention of the first vehicle, program instructions to dynamically execute vehicle operations of the second vehicle autonomously to avoid collision with the first vehicle.

* * * * *